July 24, 1951  V. J. FLYNN  2,561,569
METHOD OF MAKING CATHETERS
Filed Jan. 10, 1947  2 Sheets-Sheet 1

INVENTOR
Vincent J. Flynn
BY
Morgan, Finnegan & Durham
ATTORNEYS

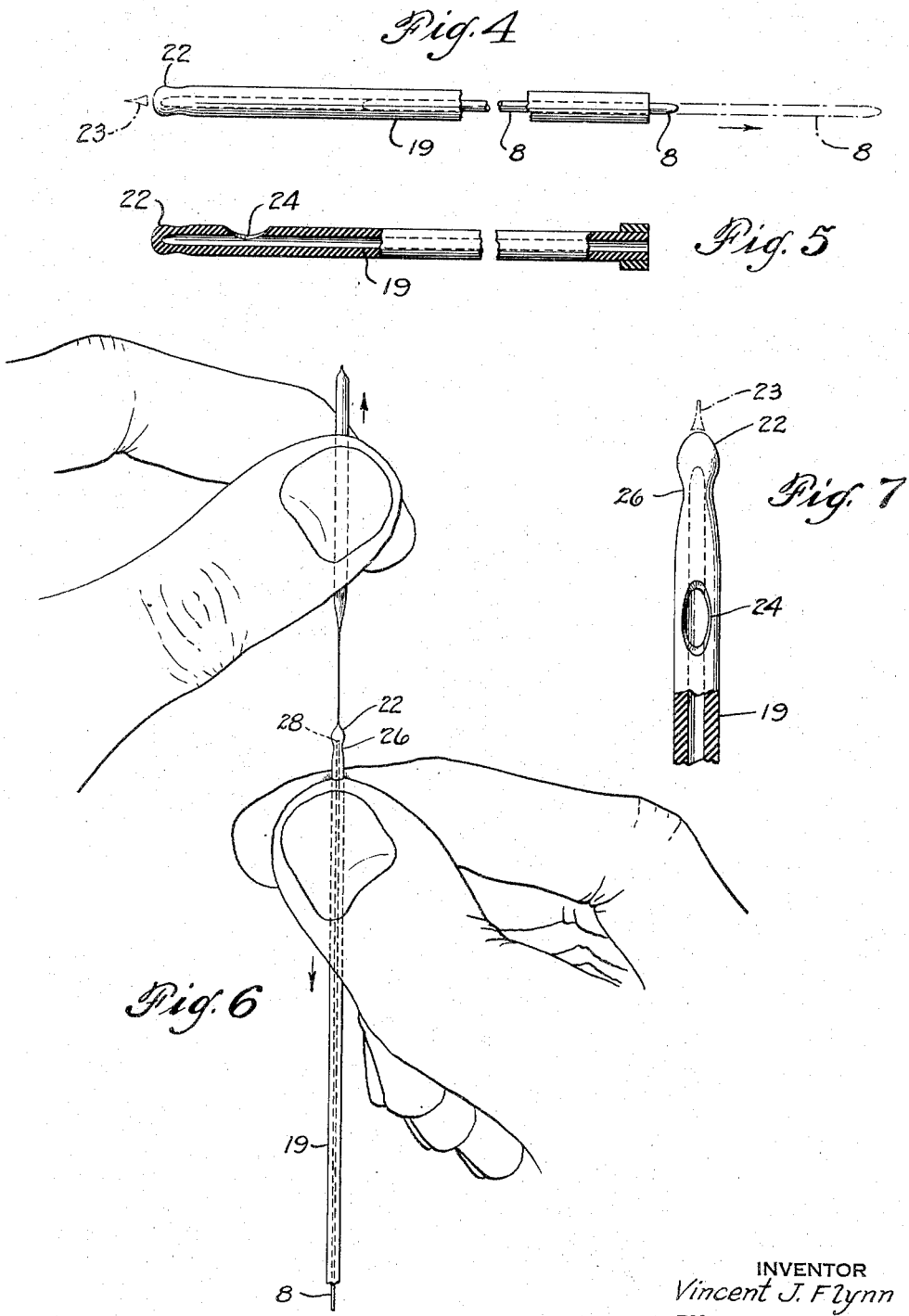

Patented July 24, 1951

2,561,569

UNITED STATES PATENT OFFICE 2,561,569

METHOD OF MAKING CATHETERS

Vincent J. Flynn, Leonia, N. J., assignor to Wardlyn Corporation, Ridgefield, N. J., a corporation of New Jersey Application January 10, 1947, Serial No. 721,255

8 Claims. (Cl. 18—13)

This invention relates to improvements in extruded plastic tubes such as catheters and to a new and useful method of forming a closed, rounded end on such tubes or catheters.

Objects and advantages of the invention will be set forth in part hereinafter and in part will be obvious herefrom, or may be learned by practice with the invention, the same being realized and attained by means of the instrumentalities, processes, steps and combinations pointed out in the appended claims.

The invention consists in the novel steps, parts, constructions, arrangements, processes, combinations and improvements herein shown and described.

In general the invention provides improvements in the method of making a closed end on an extruded tube which comprises the steps of extruding an elongated tube from a plastic mass, extruding a solid portion of plastic material at the terminus of said tube and drawing said solid portion to an attenuated section to form a rounded, closed exterior beyond the terminus of said tubular portion.

Objects of the invention are to provide catheters and like tubular objects, formed by extruding a thermoplastic material, with an improved, closed-end construction which will have the desired rounded shape and smooth surface continuity desired in such surgical instruments. Specifically, the invention provides a closed-end construction which possesses the same surface characteristics as those of the extruded side walls of the tubular catheter, chiefly because said end construction, in accordance with the novel method of the invention, is formed as a step in the extrusion process of the tube itself.

Other important objects are to provide a rapid, efficient and less expensive method of forming and shaping the closed, rounded ends on extruded catheters and similar extruded plastic tubes. The invention as stated above, permits the formation of such ends as a step in the extrusion process, so that virtually the complete operation is performed as the catheter tube merges from the extrusion die. The operation is thus not only cheaper, quicker and better adapted to mass production methods, but it also produces the desirable end construction, having the improved characteristics above referred to.

Heretofore, in the production of extruded catheters such as those disclosed and claimed in my Patents 2,237,218, 2,237,219, 2,237,220, 2,237,221, 2,237,222 dated April 1, 1941; 2,268,321 dated December 30, 1941, and 2,317,987 dated May 4, 1943, the formation of the rounded, closed ends, such as the "round tips," "whistle tips" and "olive tips" of ureteral catheters, has been accomplished as a separated operation after the catheter tube as such had been extruded and completed except for such end construction. In such former practice it was then necessary to insert one end of the extruded length of catheter tubing into a special heating and remolding die wherein the end of the desired shape and size was formed by replasticizing the thermoplastic matrix of the catheter adjacent the end to be closed and then molding said thermoplastic portion into the closed-tip shape desired.

This former practice had many disadvantages. In addition to the expense of time and labor involved in such separate and quite distinct forming operation, the end construction so formed was inferior to that provided by the present invention. The separate molding operation never could provide the same surface smoothness and continuity between the side walls and end of the catheter as are obtained through the present invention. Even though the breaks in continuity were frequently so small as to be invisible to the naked eye, they are nevertheless serious obstructions in the comfort and efficiency of use of such surgical instrument, having in mind the intimate and prolonged physical contact thereof. This matter is especially important at and adjacent that end of the catheter which, in urological practice, is inserted into the body passages such as the urethra and ureter. Frequently, however, more serious irregularities are produced in the catheter surface because of said separate remolding operation. Usually fins or ridges are formed along the side walls of the catheter adjacent the reformed end, caused by the tendency of the molten plastic to creep between the upper and lower surfaces of the die, which is usually a split or hinged die. Consequently, it was necessary to subject the said remolded end of the catheter to a final finishing operation or operations, wherein the gross irregularities caused by the remolding were first cut away and then the entire end smoothed by an abrading action, usually by hand. Not only were such final finishing operations tedious and expensive, but they necessarily destroyed the surface "ski" or original smooth finish produced by the extrusion and molding operations.

All of the foregoing disadvantages of the former practice are overcome by the invention. The closed catheter end of the desired shape is formed virtually automatically and as a step in the process of extrusion. Because it is so formed it has none of the roughness or irregularities incidental to the prior method. Obviously, and as will appear in greater detail hereinafter, the practice of the invention is much more rapid, simple and inexpensive.

It will be understood that the foregoing general description and the following detailed description as well are exemplary and explanatory of the invention but are not restrictive thereof.

The accompanying drawings, referred to herein and constituting a part hereof, illustrate an embodiment of the invention, and together with the description, serve to explain the principles of the invention.

Of the drawings:

Figure 4 is a view of a step in the making of closed end tubes;

Figures 5 and 7 are views of preferred embodiments of closed end tubes particularly useful as catheters, being shown fragmentarily and partly in section; and Figure 6 is a view of a step in the manufacture of a closed end tube showing a type of closed end hereinafter referred to as an "olive tip," particularly useful in a certain type of catheter construction.

Figure 1:
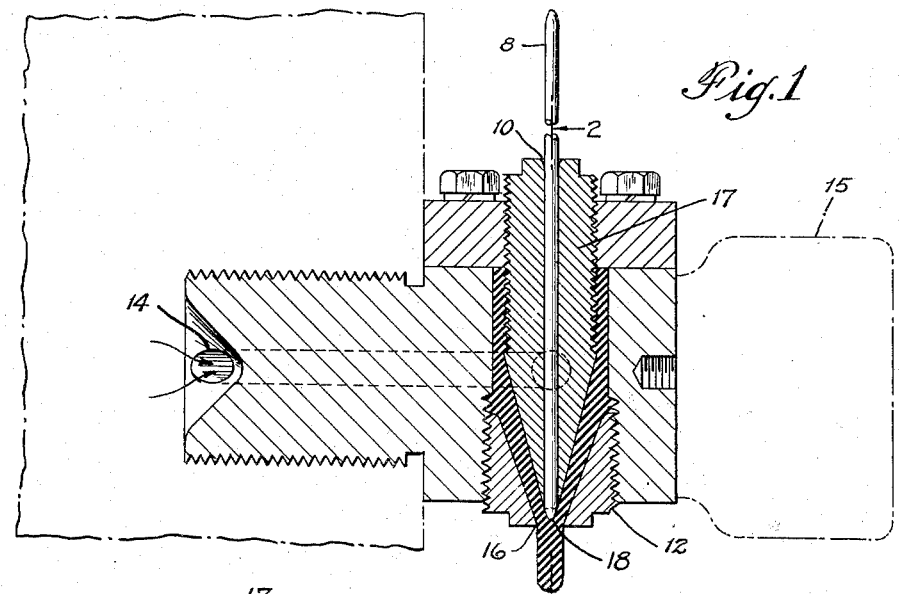
Figure 1 is a view in longitudinal section of an extrusion die.
Figures 2, 3:
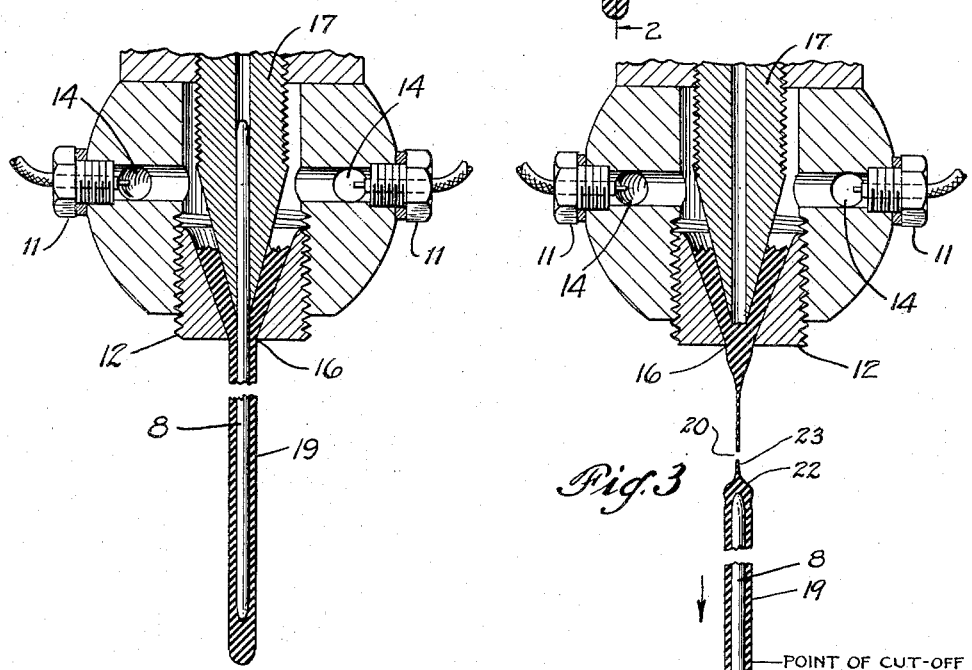
Figures 2 and 3 are views of an extrusion die in cross-section along the lines 2—2 as in Figure 1 showing successive steps in the making of closed end tubes.

Referring to the drawing in detail and particularly to Fig. 1, the tube is preferably formed by means of a mandrel 8 introduced at aperture 10 into an extrusion die 12 through a bore in member 17. Thermoplastic material under heat and pressure enters the die at 14 where it becomes fluid. While the thermoplastic material flows through the die it is heated by heater 15, the temperature being regulated by a thermocouple 11 shown in Figures 2 and 3. The fluid thermoplastic material first contacts the mandrel 8 at 18, said material flowing over it and pulling it through the die 12 to form a long, narrow tube 19 thereabout, successive steps of this extrusion operation being shown in Figures 1, 2 and 3. After the mandrel 8 has passed through the die as shown in Figure 3, the extrusion process is continued to form a solid rod portion between the die and the end of the mandrel. Then the plastic-covered mandrel is pulled away from the die by force applied along its longitudinal axis in the direction indicated by the arrow in Figure 3, whereby the still plastic material in the solid rod will be attenuated and reduced in diameter so that it breaks at some point 20 beyond the upper terminus of the mandrel (that is, the mandrel point nearest the die as shown in Figure 3). Under the influence of this drawing action, the solid plastic material flows around the mandrel tip so that a rounded closed end 22 is formed, having approximately the same thickness of thermoplastic wall as that surrounding the mandrel length. The smooth continuity of the external, thermoplastic surface produced by the extrusion process is preserved over the major portion of the surface of the rounded closed end 22 so formed, with the exception of a relatively small pointed tip 23 remaining as shown in Figure 3. Tip 23 is then severed as shown in Figure 4 and the completed rounded tip thus obtained. Any irregularity of surface in the relatively small circular end area remaining may be polished to conform with the smooth, rounded surface of the rest of the tip.

In Fig. 6 is shown a slightly different practice of performing certain steps of the invention. The extrusion process is continued for a short distance beyond the point shown in Fig. 3, after the plastic covered mandrel 8 has passed beyond the die 12. The non-tubular extruded rod of plastic material is ruptured close to aperture 16, and then while the material is still plastic, opposing forces are applied along the same axis to the non-tubular extruded thermoplastic rod and the thermoplastic covered mandrel, forming a rounded, smooth, closed end casing over the mandrel 8 in the same manner as above described. Preferably, to form the catheter shown in Figures 4 and 5, the gripping force is applied to the thermoplastic covered mandrel farther away from the mandrel tip 28 than is shown in the lower part of Figure 6. It will be understood that this preferred method is also applicable when a mandrel is not used. It has been found that the above described, preferred method is particularly useful in that the operator is able to judge very readily the correct degree of plasticity of the cooling material for the drawing operation.

Another variation of the process useful particularly in forming special shapes of tube ends is shown in Figure 6. For example in forming a so-called "olive tip" on a catheter, as shown in Figure 7, a neck portion 26 of reduced diameter is required adjacent to the terminus of the inner tubular channel 28 and short of the closed rounded end portion 22. Neck portion 26 of reduced diameter is formed by applying a gripping or constricting pressure to the thermoplastic covered mandrel close to the mandrel terminus 28 and then applying opposing forces as indicated in Figure 6 as described above. A rounded, closed end will result as above described but a neck portion 26, of reduced diameter, will also be formed because the constricting pressure does not permit the flow of thermoplastic material in response to the applied pulling force from the area beyond where the constricting pressure is applied. The result of this operation forms a tip of the shape shown in Figure 7, which has proved particularly useful as a type of catheter tip. It wil be understood that a tip of the shape described may also be formed without the use of a mandrel, as previously suggested in general.

Figures 5 and 7 illustrate how a conventional aperture 24 may be formed in the plastic sidewall 19, particularly useful in catheter forms. Figure 5 shows a type of catheter end construction known as a "whistle" tip.

In the preferred methods of catheter manufacture, where a mandrel is used in the forming of closed end tubes as described above, it is usually desirable to remove the mandrel. Figure 4 illustrates this removal process. A portion of the thermoplastic wall is removed from the mandrel 8 at its end opposite the smooth rounded closed end 22. Pulling force is applied along the axis of the exposed mandrel portion and opposite force is applied to the other end, causing the mandrel to slip out, leaving a length of thermoplastic tubing having a hollow bore open at one end and having a rounded, closed end of a preferred form.

A specific example of a preferred formula for catheter compositions is as follows: 20 to 45% by weight of dibutyl cellosolve phthalate; 40% by weight of metallic lead powder, whitened with a suitable proportion of lead titanate; 15 to 40% by weight of the copolymer of vinyl chloride and vinyl acetate formed from a mixture of 80% vinyl chloride and 20% vinyl acetate.

It will be understood that the manual operations used in the methods of forming rounded closed end tubes may be also performed mechanically.

The invention in its broader aspects is not limited to the specific mechanisms, processes and steps shown and described but departures may be made therefrom, within the scope of the accompanying claims, without departing from the principles of the invention and without sacrificing its chief advantages.

What I claim is:

1. The method of making a closed end on an extruded tube which comprises the steps of extruding a tube through a die from a thermoplastic mass, continuing the extrusion in a solid rod portion beyond the terminus of said tube and forming a closed end beyond said tube terminus by drawing said solid rod into a rounded attenuated point.

2. The method of making a closed end on an extruded tube which comprises the steps of extruding a tube through a die from a thermoplastic mass, continuing the extrusion in a solid rod portion beyond the terminus of said tube and pulling said solid portion away from said terminus to draw a rounded solid end about said terminus.

3. The method of making a closed end on an extruded tube which comprises the steps of forming a tube from a heated mass of thermoplastic material by feeding a forming mandrel through an extrusion die and extruding said material around the mandrel, continuing the extrusion of material for a limited period beyond the terminus of said mandrel and drawing said latterly extruded solid material away from said terminus to form a closed rounded end thereabout.

4. The method of making a closed end on an extruded tube which comprises the steps of forming a tube from a heated mass of thermoplastic material by feeding a forming mandrel through an extrusion die and extruding said material around the mandrel, continuing the extrusion of material for a limited period beyond the terminus of said mandrel and drawing said laterally extruded solid material away from said terminus to form a closed rounded end thereabout by pulling the tubular portion and the solid portion in opposite directions to attenuate and rupture said solid portion.

5. The method of making a closed end on an extruded tube which comprises the steps of forming a tube from a heated mass of thermoplastic material by feeding a forming mandrel through an extrusion die and extruding said material around the mandrel, continuing the extrusion of material for a limited period beyond the terminus of said mandrel and drawing said latterly extruded solid material away from said terminus to form a closed rounded end thereabout by pulling the tubular portion and the solid portion in opposite directions axially of the tube to attenuate and rupture said solid portion.

6. The method of making a closed end on an extruded tube which comprises the steps of forming a tube from a heated mass of thermoplastic material by feeding a forming mandrel through an extrusion die and extruding said material around the mandrel, continuing the extrusion of material for a limited period beyond the terminus of said mandrel and drawing said latterly extruded solid material away from said terminus to form a closed rounded end thereabout by gripping the tube adjacent the terminal portion of the mandrel to inhibit flow of material along the mandrel and pulling the solid material away from the end of the mandrel to form a solid round end with a reduced neck.

7. The method of making a closed end on an extruded tube which comprises the steps of forming a tube from a heated mass of thermoplastic material, by feeding a forming mandrel through an extrusion die and extruding said material around the mandrel, continuing the extrusion of material for a limited period beyond the terminus of said mandrel and drawing said latterly extruded, solid material away from said terminus to form a closed rounded end by pulling the tubular portion and the solid portion in opposite directions axially of the tube to attenuate and rupture said solid portion, said attenuation and rupturing leaving a small, pointed tip on said closed, rounded end, severing said small tip from said rounded, closed end and polishing any irregularity of surface remaining at the point of severance to provide a rounded, continuous surface.

8. The method of forming a closed bulbous body with a reduced neck portion, on one end of a tubular member which consists in extruding a cylindrical shell from a heated mass of thermoplastic material by feeding a forming mandrel through an extrusion die and extruding the plastic material about the mandrel to the terminus thereof, continuing the extrusion of the plastic material for a limited period beyond the terminus of the mandrel to form a solid extension thereon, gripping and drawing the extruded solid extension away from the terminus of the mandrel while gripping the extruded shell at a point adjacent the terminus of the mandrel and drawing thereon in an opposite direction axially thereof to attenuate and rupture the solid extension beyond the terminus of the mandrel while partially attenuating the extruded shell at and adjacent the terminus of the mandrel whereby to gather the end of the extruded shell into a solid bulbous body on and beyond the terminus of the mandrel, and subsequently removing a residual tip remaining on the bulbous body flush therewith.

VINCENT J. FLYNN.

REFERENCES CITED

The following references are of record in the file of this patent:

UNITED STATES PATENTS

| Number | Name | Date |
|---|---|---|
| 368,591 | Jones et al. | Aug. 23, 1887 |
| 390,177 | Lee | Sept. 25, 1888 |
| 402,902 | Chapman | May 7, 1889 |
| 862,475 | Haywood | Aug. 6, 1907 |
| 2,128,239 | Ferngren | Aug. 30, 1938 |
| 2,237,222 | Flynn | Apr. 1, 1941 |
| 2,340,068 | Limbert | Jan. 25, 1944 |
| 2,379,816 | Mabbs | July 3, 1945 |